April 11, 1939.  A. MOORHOUSE  2,154,212
CLUTCH
Filed Jan. 8, 1937  2 Sheets-Sheet 1

Inventor:
Alfred Moorhouse
By Edward C. Gritzbaugh
Atty.

April 11, 1939.   A. MOORHOUSE   2,154,212
CLUTCH
Filed Jan. 8, 1937   2 Sheets-Sheet 2

Inventor:
Alfred Moorhouse
By Edward C. Gritzbaugh
Atty.

Patented Apr. 11, 1939

2,154,212

UNITED STATES PATENT OFFICE 2,154,212

CLUTCH

Alfred Moorhouse, Detroit, Mich., assignor to Morse Chain Company, Ithaca, N. Y., a corporation of New York Application January 8, 1937, Serial No. 119,564

10 Claims. (Cl. 192—45.1)

This invention has to do with an overrunning clutch, and relates particularly to an improved clutch wedge member and retaining means therefor.

Heretofore in the construction of overrunning clutches comprising a plurality of roller wedge members disposed between coaxial driving and driven clutch members, a common practice has been to confine the wedge members in a cage including side rings disposed at opposite ends of the wedge members and apertured to provide individual trunnion bearings for such wedge members. This structure may be designed to function satisfactorily for connecting the driving and driven clutch members while the driven member is at rest or rotating at a low speed. But when the driving member is accelerated to overtake and drive the driven member which has been overrunning at a high rate of speed, the wedge members do not rotate freely because of considerable frictional resistance which occurs because of increased pressure at their trunnions, which pressure is effected by the centrifugal force of the wedge members. Such resistance to clutch actuation sometimes is the cause of the driving member attaining a speed slightly in excess of the driven member prior to clutch engagement, whereby the engagement is not as shockless and noiseless as it is when occurring exactly coincidently with synchronization of the driving and driven members.

One of the objects of the present invention is the provision in overrunning clutches of the wedge member type of an improved cage or wedge member retaining means adapted to minimize frictional resistance to movement of such wedge members into clutch engaging position irrespective of clutch speed.

Another object of the present invention is the provision of a new retaining means which permits the wedge members to become adjusted into the working or clutching position independently of one another.

Another object of the present invention is the provision of a novel retaining means with which the clutch wedge members have merely rolling contact in contradistinction to sliding contact.

Still another object of the present invention is the provision of an improved overrunning clutch of the above type wherein centrifugal force acting upon the wedge members is ineffective to augment the friction engagement thereof with a coacting power transmitting member of said clutch while the clutch is overrunning.

The above and other desirable objects of the invention will become apparent upon reading the following description in conjunction with the two sheets of drawings forming a part of this specification, and wherein.

The same reference characters will be used for designating like parts shown throughout the several figures of the drawings.

Figure 1:
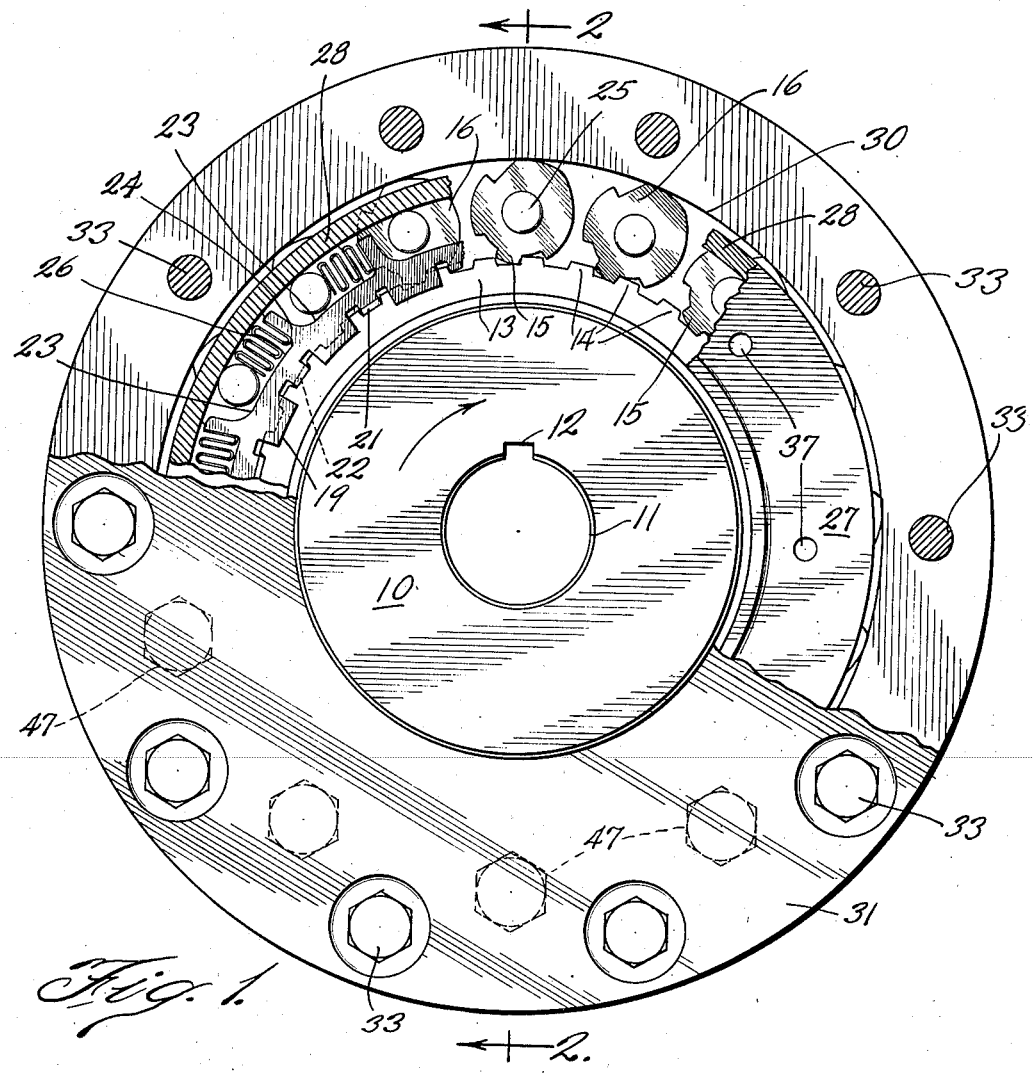
Fig. 1 is an end view taken along the line 1—1 of Fig. 2, and illustrating a clutch structure embodying the present invention, parts of the clutch being shown as broken away.
Figure 2:
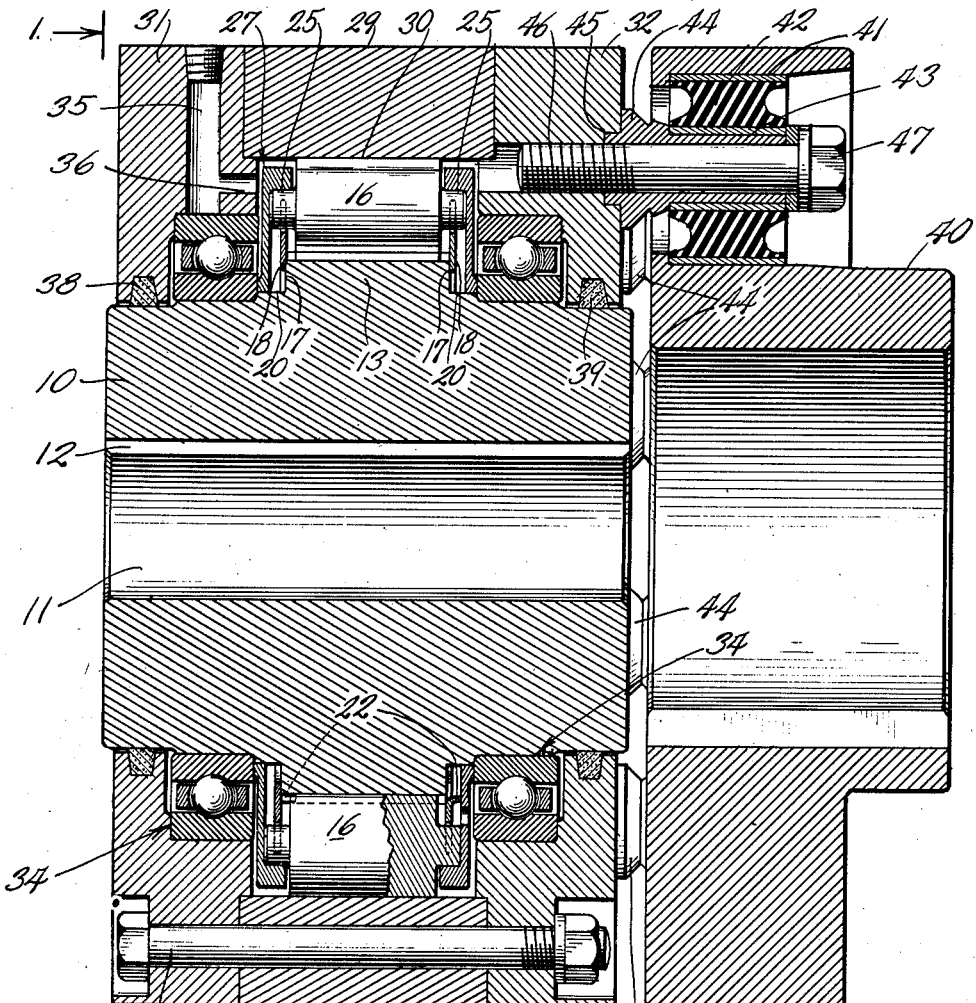
Fig. 2 is a longitudinal sectional view taken on the line 2—2 of Fig. 1.

Referring first to Figs. 1 and 2, the overrunning clutch device will be seen to comprise a hub-like driving member 10 having therein an axial opening 11 for receiving a driving shaft, not shown. The opening 11 may be grooved as at 12 to permit the driving member 10 to be keyed to the driving shaft. A raised section 13 circumscribes the clutch driving member 10. Gear teeth 14 arranged concentrically of the axis of the driving member traverse the raised section 13 axially of the device and are adapted to coact with teeth 15 upon the periphery of clutch wedge members 16.

Figure 3:
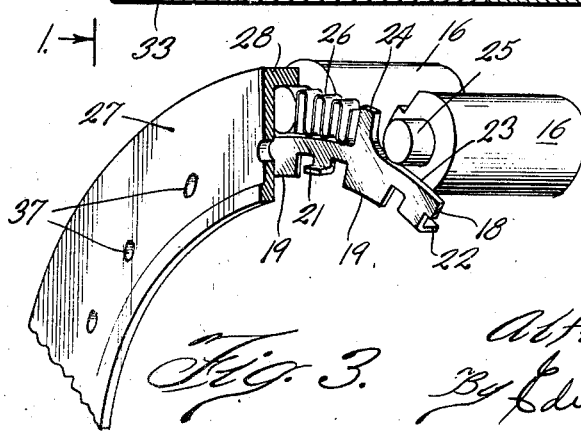
Fig. 3 is a fragmentary perspective view of clutch wedge members and retaining carrier means therefor.

Seated against shoulders 17 of the annular raised section 13 are carrier rings 18 which may be stamped from sheet metal. The rings 18 may be of identical construction as illustrated in Fig. 3. Said rings 18 will be seen to have circumferentially spaced bearing surfaces 19 engaging shoulders 20 of the clutch driving member 10. Axially extending lugs 21 and 22 are alternately disposed between the ring bearing surfaces 19. It will be noted that lugs 21 extend in the opposite direction with respect to lugs 22. Lugs 22 of the left ring, Fig. 2, are sized and spaced for disposal within the intervals between the gear teeth 14 of the driving member 10. Such ring 18 is thus caused to rotate with the member. The right ring 18, Fig. 2, has its lugs 21 projecting into certain of the spaces between the gear teeth 14 of the driving member, and is likewise caused to rotate with said driving member. Elongated arcuate slots 23 are formed upon the rings 18 between radially extending lugs 24. The slots 23 are adapted to receive axially extending bearing sections 25 of the wedge members 16. Expansion springs 26 are disposed between the lugs 24 and the bearing sections 25 in the manner illustrated in Figs. 1 and 3. Said springs 26 constantly urge the wedge members 16 counterclockwise of the clutch device as seen in Figs. 1 and 3.

Also disposed upon annular shoulders 20 of the driving member 10 are flanged retaining rings 27 of which the opposed flanges 28 coact with the bearing sections 25 of the wedge members 16 to preclude bodily radial movement of said wedge members incident to their revolution about the central axis of the device during rotation thereof. Lugs 21 of the left ring 18, Fig. 2, serve to keep the left retainer at a distance, whereas the lugs 22 upon the right ring 17 space said ring and the right retainer 27.

An annular member 29 having a hardened interior surface 30 is adapted to be driven from the wedge members 16. Opposite ends of the driven member 29 are supported upon annular pieces 31 and 32. Driven parts 29, 31 and 32 may be secured rigidly together by means of a plurality of bolts 33 of which the heads and nuts may be countersunk in the members 31 and 32 as shown in Fig. 2. The rigid assembly of parts 29, 31 and 32 is carried rotatively upon the driving member 10 by means of ball bearings indicated generally at 34 so that the surface 30 is concentric to the axis of the axis of the driving member 10. Lubrication passages 35 and 36 are provided in the annular driven piece 31 and apertures 37 are provided at spaced intervals about the ring members 27 to facilitate the pervasion of lubricant through the device which may be introduced thereinto through the passages 35 and 36. Sealing rings 38 and 39 are provided to prevent escape of lubricant from the device.

A driven shaft or other driven means (not shown) may be secured to the device by means comprising a coupling member 40. Said member 40 has a plurality of spaced seats 41 wherein there are disposed cushion members 42. The cushions 42 contain apertures for receiving sleeves 43 which have a base section 44 seated in respective recesses 45 in the exposed end face of the annular member 32. The recesses 45 are countersunk and threaded at 46 for receiving bolts 47 which hold the coupling member 40 in assembly with the device. Part of the bolts 47 are indicated in dotted outline in Fig. 1.

Figure 4:
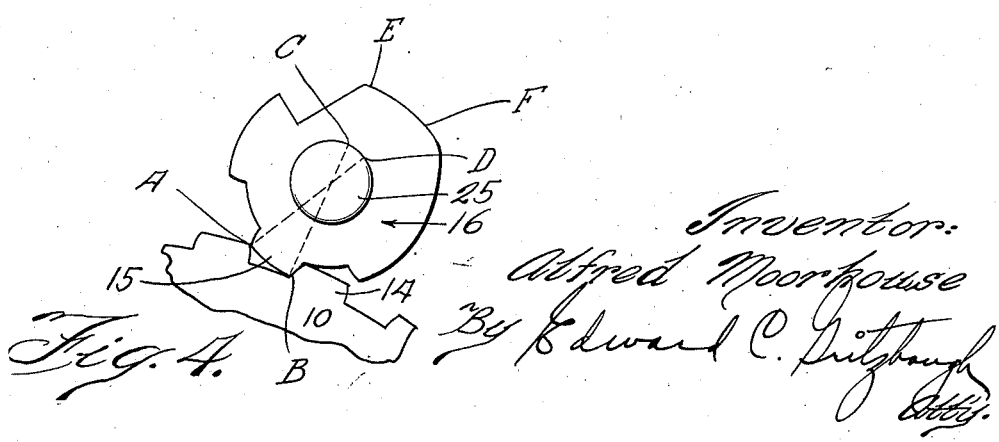
Fig. 4 is an enlarged end view of a clutch wedge member.

A detail of the end structure of the wedge members 16 is illustrated in Fig. 4. Attention is directed to the fact that the teeth 15 of the wedge members 16 have an arcuate crown section AB developed about an axis coincident with that of the bearing section 25. It will be conceived, therefore, that the distance is the same between any point upon the arc AB and the diametrically opposed point upon the shorter arc CD. The radial distance AD or BC is substantially equal to the distance (radially of the clutch device) between the bottom of the space between any two adjacent teeth 14 and the inner surface of the flange 28 of either of the ring members 27. Such a construction provides that the arcuate bearing surfaces CD of each of the wedge members 16 will always remain in contact with the inner peripheries of the flanges 28 while such wedge members are oscillated relatively to the principal axis of the device while the crown sections AB of the teeth 15 thereon are rolling upon their respective spaces between adjacent teeth 14 of the driving member 10. Stated differently, the construction provides that the distance between the rotational axes of the wedge members 16 and the axis of the clutch device remains unchanged while said wedge members are oscillated slightly incident to the operation of the device.

As may be plainly seen in the Figs. 1 and 4, the friction surface EF of the rollers or wedge members 16 is of varying radius, the radius increasing with respect to the axes of the individual members 16 as F is approached.

The operation of the device will now be described.

It will first be assumed that both the driving and driven members 10 and 29 of the device are at rest. The springs 26, Figs. 1 and 3, reacting upon the driving member 10 through the rings 18 tend to urge the wedge members 16 counterclockwise. Such counterclockwise movement of the wedge members 16 is limited by some section within the areas EF of the wedge members contacting the inner periphery 30 of the driven member 29 because of the engagement of the portion 15 of the wedge members with the toothed portion 14 of the drive member. The degree of firmness with which the sections within the areas EF bear against the inner periphery 30 depends solely upon the force exerted by the springs 26. Now, if the driving member 10 is rotated clockwise as indicated by the arrow in Fig. 1, the frictional engagement between areas EF and the inner periphery of the ring member 29 will cause the pivotal wedge members 16 to rock still farther counterclockwise upon their own axes to dispose a section thereof of greater radius between the driving and driven members. In this manner the wedge members 16 are caused to provide a wedged driving connection between the members 10 and 29 whereby the latter may be driven from the former.

Should the driving force now be relieved from the driving member 10, the momentum of a load connected to the coupling member 40 will tend to reverse the drive through the clutch device. Such a tendency to reverse the drive will, however, because of the frictional engagement between the member 29 and the wedge members 16, rock said wedge members 16 clockwise relative to the driving member 10 to thereby bring sections of shorter radius (within the areas EF) between the driving and driven members and to thereby release the driving connection and permit the driven part to overrun the driving part.

It will be conceived that during rotation of the driving member 10 upon which the wedge members 16 are carried while the driven element 29 is overrunning said driving member, there will be a tendency for the wedge members 16 to be thrown centrifugally against said driven member 29. Such centrifugal tendency of the wedge members 16, is however, precluded by the flanges 28 of the rings 27. In other words, the flanges 28 which serve as bearing members against the arcuate sections CD of the bearings 25 upon the wedge members 16 prevent bodily movement of said wedge members radially outwardly of the device.

Since the rings 27 merely float in the device, they are rotated by the wedge members during movement of the members to and from clutch engaging position. That is, there is rolling contact between bearings 25 and the inner periphery of the ring flanges 28 and it follows that since the rings 27 are free to rotate about the principal axis of the clutch they will so rotate relatively to the driving part 10 incident to movement of the wedge members with respect to such part. Thus it will be seen that the bearing rings 27 retain the wedge members 16 in a manner permitting of their movement relative to the rings 27 with but little frictional resistance since the rings 27 and bearing 25 of the wedge members have a rolling anti-friction contact in contra-distinction to the sliding friction contact had with wedge members by ordinary retainer cages having aperture bearings for rotatively receiving sections of wedge members. The force of such sliding contact is multiplied many times when the clutch is turning over at high speeds and has the undesired effect of opposing the action of the springs which urge the wedge members into clutching engagement. This difficulty is substantially overcome by the present structure.

Attention is also directed to the fact that the wedge members 16 are themselves so proportioned as to be substantially balanced against rotative tendencies about their own axes due to the action of centrifugal force thereon while bearing upon the flanges 28 with any part CD of their bearing sections. It follows that centrifugal force plays no notable part in determining the firmness with which the wedge members 16 bear against the friction interior surface of the driven member 29. Such firmness is determined solely by the strength of the springs 26. Thus it is possible to calibrate the springs 26 so that they will bear against the rollers 16 with the proper amount of force necessary to cause the wedge members 16 to have sufficient frictional engagement with the surface 30 to cause rocking of the wedge members 16 and quick lockup of the clutch upon the driving member 10 tending to drive the driven member. By selecting springs 26 of proper strength, the frictional engagement between the wedge members 16 and the surface 30 may be made the minimum at all times of that required, thus reducing wear upon the coacting friction surfaces and minimizing heat loss in the device. The present structure consequently provides for a long life clutch insured against injury from overheating. Moreover, with the minimizing of friction there is a corresponding increase in efficiency of the device as an overrunning power transmitting instrumentality.

It is to be understood that the particular clutch structure shown in the specification and drawings and described hereinabove has been selected only for the purpose of illustrating the principles of the invention. The physical embodiments wherein the principles herein disclosed may be employed are obviously manifold, hence the invention shall be construed as co-extensive with the scope defined in the appended claims.

I claim:

1. An overrunning clutch comprising coaxially rotatable driving and driven members, a cam element on one of said members and pivotal into a position to effect a driving connection between said members, said cam element having a surface for frictionally engaging the other of said members so that relative rotative movement between said members in one direction causes said cam element to pivot into such driving connection position, said cam element having a bearing surface disposed substantially concentrically of its pivotal axis, and bearing means rollably engaging said bearing surface, said bearing means preventing bodily movement of said cam element toward the other of said members but permitting relative lateral rolling movement of the cam element in a path concentric to the axis of said coaxial members.

2. An overrunning clutch comprising coaxially rotatable power transmitting members of which one is adapted to be driven by frictional engagement, pivotal friction elements on the other of said members, said pivotal elements each having a surface for frictionally engaging said one member to cause wedging of said elements between said members incident to relative rotation of said members in one direction, said elements effecting a driving connection between said members when so wedged and releasing such wedging connection incident to relative rotation of said members in the opposite direction, said elements also having a bearing surface substantially concentric with their pivotal axes, and bearing means rollably engaging said bearing surfaces to prevent bodily movement of said pivotal elements toward said one member but permitting relative lateral rolling movement of said friction elements in a path concentric to the axis of said coaxial members.

3. An overrunning clutch comprising inner and outer coaxially rotatable power transmitting members, a cam element on one of said members and disposed between said members, said cam element being rockable for frictionally engaging a section thereof with the other of said members and being so shaped that such frictional engagement causes further rotation thereof to effect a driving connection between said members incident to relative rotation of said members in one direction, and means associated with said one of said members providing independently of said inner and outer power transmitting members a rolling bearing engagement with said cam element and for preventing bodily movement of said cam element radially of said members.

4. An overrunning clutch comprising power transmitting members having inner and outer coaxially rotatable sections of which the outer is adapted to be driven by frictional engagement, a rockable friction element on such inner section, said pivotal element having a surface for frictionally engaging said outer section to cause wedging of said element between said sections incident to relative rotation of said members in one direction, said element effecting a driving connection between said members when so wedged and releasing such wedging connection incident to relative rotation of said members in the opposite direction, and holding means associated with said member having the inner section, said holding means providing independently of said inner and outer sections a surface along which said friction element may roll, and for restraining said element against bodily movement radially of said members.

5. In an overrunning clutch including a frictional driven member, a wedge member rollably mounted upon an axis parallel to the axis of said driven member having a friction surface section eccentric to its axis, said wedge member being rollable to move such friction surface into cooperative relation with said driven member, and said wedge member having a section whereby said wedge member is engageable in a manner permitting of such rollable movement and precluding bodily movement thereof radially of the axis of rotation of said driven member because of centrifugal force acting thereon during revolution thereof about such axis.

6. In an overrunning clutch including a frictional driven member, a plurality of wedge members rockably mounted upon axis parallel to the axis of said driven member each having a friction surface section eccentric to its axis, said wedge members being rollable to move their respective friction surfaces into cooperative relation with said driven member, said wedge members also each having a bearing section engageable in a manner permitting of such rollable movement thereof, and an annular member engaging all of said bearing sections in such manner, said annular member further functioning to preclude bodily movement of said wedge members radially of the axis of rotation of said driven member because of centrifugal force acting thereon during such rotation.

7. In an overrunning clutch device having a principal axis of rotation, the combination of a frictional driven member, a wedge member having an individual axis of oscillation and being revolvable about such principal axis, said wedge member having a friction surface section adapted to drivingly engage said driven member, said wedge member also having a bearing section arranged substantially concentrically of its individual axis, and a wedge member retaining means having a bearing surface arranged substantially concentrically of such principal axis, the bearing surface of said retaining means being disposed for rolling engagement with the bearing section of said wedge member and for restraining movement of the wedge member radially from such principal axis because of centrifugal force during rotation of said device.

8. In an overrunning clutch device, a rotatable power transmitting member, a plurality of clutch wedge members on said power transmitting member, said wedge members having individual axes of oscillation and being revolvable about the rotational axis of said power transmitting member, said wedge members each having a bearing surface arranged concentrically of its individual axis, and a wedge member retaining ring rotatable upon said power transmitting member and having an internal bearing surface arranged concentrically of the rotational axis of said member, the bearing surface of said ring being disposed of rolling contact with the bearing surfaces of said wedge members to restrain bodily movement thereof radially of said power transmitting member.

9. In an overrunning clutch device, a rotatable power transmitting member having thereon a toothed outer section, a plurality of clutch wedge members in annular array about said power transmitting member and having teeth in mesh with the teeth of said member, said wedge members also having a bearing surface of which an ever changing portion remains at substantially a uniform distance from the rotational axis of said power transmitting member during oscillation of said wedge members, and means rotatable relatively to said power transmitting member about such axis and having disposed for engagement with the bearing surfaces of said wedge members an internal bearing surface arranged substantially concentrically of such axis.

10. In an overrunning clutch device, a rotatable power transmitting member, a plurality of oscillatable clutch wedge members in annular array about said power transmitting member, there being between said wedge members and said power transmitting member a power transmitting connection that remains mobilized during revolution of said wedge members about the axis of the power transmitting member, said wedge members having bearing surfaces remaining substantially at a fixed distance radially from the rotational axis of said power transmitting member during such revolution, and means having an internal bearing surface disposed for contacting said wedge member bearing surfaces to limit bodily movement of said wedge members radially of such rotational axis, said means being adapted to provide for such contact therebetween and said wedge members being a rolling contact.

ALFRED MOORHOUSE.